United States Patent [19]

Ivanov et al.

[11] 4,446,374

[45] May 1, 1984

[54] ELECTRON BEAM ACCELERATOR

[76] Inventors: Andrei S. Ivanov, ulitsa Kuznetsovskaya, 8, kv. 33; Leonid V. Komorin, poselok Metallostroi, ulitsa Pushkinskaya, 8, kv. 35; Vladimir I. Nikishkin, ulitsa Yaroslava Gasheka, 2, kv. 459; Mikhail P. Sviniin, poselok Metallostroi, ulitsa Bogaichuka, 4, kv. 25; Mikhail T. Fedotov, poselok Metallostroi, ulitsa Polevaya, 22, kv. 58, all of Leningrad, U.S.S.R.

[21] Appl. No.: 336,353

[22] PCT Filed: May 5, 1980

[86] PCT No.: PCT/SU80/00068

§ 371 Date: Jan. 4, 1982

§ 102(e) Date: Jan. 4, 1982

[87] PCT Pub. No.: WO81/03253

PCT Pub. Date: Nov. 12, 1981

[51] Int. Cl.$^3$ .......................... C08J 7/10; G21K 1/00

[52] U.S. Cl. ................................................ 250/492.3

[58] Field of Search ......................... 250/492.3; 313/7; 328/233

[56] References Cited

U.S. PATENT DOCUMENTS 2,424,791 7/1947 Bachman et al. .................. 250/311
3,433,947 3/1969 Emanuelson et al. .
3,883,413 5/1975 Douglas-Hamilton .

FOREIGN PATENT DOCUMENTS 47-46318 11/1972 Japan .
51-2598 1/1976 Japan .
531457 6/1979 U.S.S.R. .......................... 250/492.3

OTHER PUBLICATIONS

I. I. Buslaev, N. G. Konkov, O. N. Kochetov, and S. Yu. Krylov, "Self-Shielding Facility for the Modification of Tissue and Polymer Films with an Electron Accelerator Based on the RUP-400 X-Ray Equipment" *Atomnaya Energiya,* vol. 39, No. 6, p. 446, (Dec. 1975).

Russian Article Having Translated Title "Industrial Accelerators of 'Electron' Type for Radiative Chemistry", V. V. Akulov et al., Preprint D-0198. L. Sriea, 1974, 18 p. with illustration.

*Primary Examiner*—Alfred E. Smith
*Assistant Examiner*—Constantine Hannaher
*Attorney, Agent, or Firm*—Fleit, Jacobson, Cohn & Price

[57] ABSTRACT

An electron beam accelerator comprises a radiation protection chamber 10 accommodating a partition 12 which in combination with a vacuum chamber 1 hermetically divides the radiation protection chamber 10 into two compartments 14, 15. One compartment 14 accommodates an exit window 2 of the vacuum chamber 1, while the other compartment 15 accommodates an electron beam scanning system 8, vacuum pumps 3 and a vacuum monitoring device 5.

1 Claim, 1 Drawing Figure

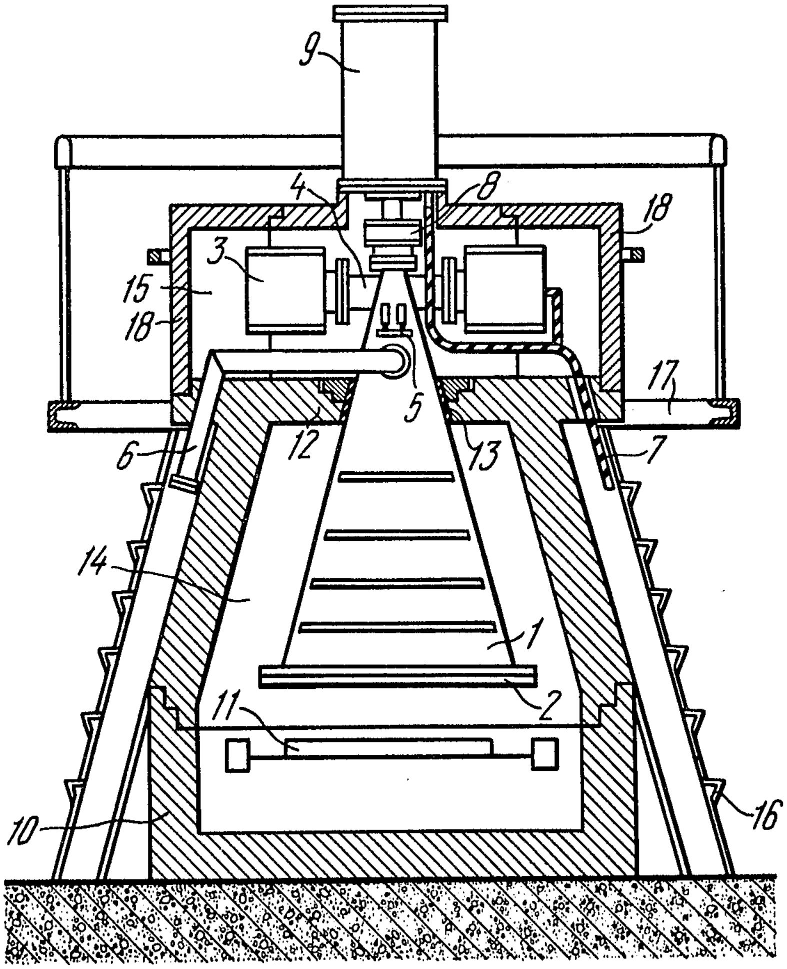
9
4
8
18
3
15
18
5
17
6
12
13
7
14
1
2
11
10
16

ELECTRON BEAM ACCELERATOR

FIELD OF THE INVENTION

The present invention relates to accelerator technique, and more particularly to electron beam accelerators.

BACKGROUND OF THE INVENTION

Known to the prior art is an electron beam accelerator (cf. U.S. Pat. No. 3,433,947 published in 1969), comprising a completely shielded vacuum chamber with an electron beam scanning system, and an exit window made of foil, passing the electron beam into the atmosphere. The material to be irradiated by the electron beam is moved in front of the exit window. To create and maintain the required vacuum in the vacuum volume of the accelerator, a vacuum pump is connected to the vacuum chamber by a pipeline. The pipeline is passed through a hole in the wall of the vacuum chamber. Mounted in front of this hole is a lead plate 1 inch thick to create multiple reflections and, consequently, to attenuate X-ray radiation. This attenuation results from electron deceleration in the irradiated material and when passing through the vacuum volume of the chamber, the pipeline and the vacuum pump into the atmosphere.

Owing to the lead plate the inner part of the pipeline takes a bent configuration and thus its length and resistance increases, which results in a decrease of evacuation rate and in a reduction of a highest attained vacuum in the vacuum chamber. This degradation of vacuum lowers reliability of the electron accelerator on one hand due to shortened service life of the electron source, i.e. electron gun of the accelerating tube, and on the other hand, due to a gas current and an additional decelerating X-ray radiation, thus increasing the probability of an electric breakdown of the tube.

Also known in the art is an electron beam accelerator described in an article titled "Promyshlennye Uskoriteli Serii 'Electron' dlya Radiatsionnoi khimii" by V. V. Akulov et al., preprint by NIIEFA, Leningrad, 1974, p. 11. This accelerator comprises a radiation protection metal chamber, accommodating a vacuum chamber with an exit window, an electron beam scanning system, vacuum pumps and a vacuum monitoring device. Since the vacuum pumps and the said device are arranged within the radiation protection chamber together with the vacuum chamber, the pumps are connected to the chamber with straight pipelines (i.e. with no elbows) featuring lower resistance as compared to a bent pipeline used in an electron beam accelerator according to the aforesaid U.S. Patent. Thus, the vacuum pumps can provide higher vacuum in the chamber without any undesired effects associated with degradation of vacuum in the accelerator.

When the accelerator operates, the electron beam, passing through the window of the vacuum chamber not only causes deceleration of the X-ray radiation as it strikes the irradiated material and the elements of the conveyor moving this material under the window but also disintegrates the gaseous medium in the irradiation zone i.e. nitrogen oxygen and carbon dioxide of the air, and forms carbon monoxide, nitrogen dioxide, cyanogen and other active chemical substances. Poisonous, fire—and explosion—hazard substances may also be formed due to the action of the electron beam on the irradiated material and surrounding objects. Since all mentioned elements of the accelerator are enclosed together with the exit window and the irradiation zone within the volume of the radiation protection chamber the above-mentioned substances with high chemical activity and strong X-ray radiation formed in the immediate vicinity to the exit window cause corrosion and destruction of the accelerator elements in the radiation protection chamber.

Thus, reliability of this accelerator, as well as reliability of the accelerator according to U.S. Pat. No. 3,433,947 turns out to be unsufficient, although due to other reasons. Moreover, to prevent leakage of the X-ray radiation outside, all lead-ins of different communications (electric power supply, initial vacuum pipeline etc.) to the elements of the accelerator should have complicated labirinth seal in the radiation protection chamber, which present difficulties in maintenance of the accelerator elements located in the said chamber and of the accelerator as a whole.

SUMMARY OF THE INVENTION

It is an object of the present invention to increase the reliability of the electron beam accelerator.

The principal object of the invention is to provide an electron beam accelerator whose radiation protection chamber should be made so that an electron beam scanning system, vacuum pumps and a vacuum monitoring device are not exposed to chemically active substances formed as a result of interaction between accelerated electrons and gaseous medium, and to strong X-ray radiation.

With this principal object in view, there is provided an electron beam accelerator comprising a radiation protection chamber accommodating a vacuum chamber with an exit window, an electron beam scanning system and vacuum pumps connected to the vacuum chamber and a vacuum monitoring device, wherein, according to the invention, the radiation protection chamber has a partition which, in combination with the vacuum chamber divides this chamber into two sealed compartments, one of the compartments accommodating the exit window of the vacuum chamber and the other accommodating the electron beam scanning system, the vacuum pumps and the vacuum monitoring device.

This partition mounted in the chamber of radiation protection weakens the decelerating X-ray radiation, which attacks the electron beam scanning system, the vacuum pumps and the vacuum monitoring device. This weakening is accounted for by a rather large distance between the compartment accommodating said elements and the exit window, and also by the fact, that the cross sectional area of the vacuum chamber in the place where the partition is mounted is less than that in the place where the exit window is disposed. Moreover, this sealed partition eliminates penetration of substances of high chemical activity formed due to destruction of gaseous medium in the zone of irradiation to the above-mentioned elements of the accelerator.

The invention will now be described in greater detail with reference to specific embodiment taken in conjunction with accompanying drawing.

BRIEF DESCRIPTION OF THE DRAWING

The drawing shows a longitudinal section of the electron beam accelerator, according to the invention.

BEST MODE TO CARRY OUT THE INVENTION

Referring to the drawing, the electron beam accelerator according to the invention comprises a vacuum chamber 1, representing a metal bell with an exit window 2 made of a foil and arranged at the widest part of said bell. This window is designed to pass the electron beam out into the atmosphere. In the narrow part of the chamber 1 high vacuum pumps 3 connected to the chamber 1 by pipelines 4 and a vacuum monitoring device 5 connected to the chamber 1 by the similar pipelines (not shown) are located. The device 5 comprises measuring instruments, for example, vacuum gauges and interlocking devices designed to cut off power supply of the accelerator in case vacuum in the chamber 1 drops lower than the required value.

A pipeline 6 of an initial vacuum pump (not shown) is connected to the chamber 1. Power supply to the accelerator is fed by cables 7.

At the throat of the chamber 1 an electron beam scanning system 8 is mounted providing periodical movement of the beam over the exit window 2. The throat of the vacuum chamber 1 is connected to the outlet of the accelerating tube of an electron beam source 9 forming in combination with the vacuum chamber 1 a single vacuum volume.

The vacuum chamber 1, the electron beam scanning system 8 the vacuum pumps 3 and the vacuum monitoring device 5 are housed in a radiation protection chamber 10. The chamber 10 is made of metal capable to absorb X-ray radiation, for example, of several layers of lead and steel, and having such a thickness of the walls as to maintain the level of the X-ray radiation passing through the walls of the chamber 10 within the admissible value. The lower part of the chamber 10 is made detachable to provide access to a conveyor (not shown) carrying a material 11 to be irradiated by accelerated electrons under the exit window 2.

The chamber 10 according to the invention is provided with a partition 12 made of the same material as the chamber 10, the thickness of the partition 12 being actually equal to the thickness of the walls of the chamber 10 in its lower part. The chamber 1 is fixed on the partition 12 through a sealing 13. The partition 12 together with the chamber 1 divides the chamber 10 into two sealed compartments—lower 14 and upper 15. The exit window 2 of the chamber 1 is disposed in the lower compartment 14. In the upper compartment 15 there are arranged the vacuum pumps 3, the vacuum monitoring device 5 the electron beam scanning system 8 and, partially, the pipeline 6 and the power supply cables 7.

The partition 12 should, apparently, be mounted as close to the throat of the chamber 1 as possible to provide an effective protection of the accelerator elements located in the upper compartment 15 of the chamber 10. It is also apparent, that the thickness of the chamber 10 walls in the upper compartment 15 may be much less than that in the lower compartment 14.

A staircase 16 and a platform 17 for maintenance personnel are installed close to the accelerator to provide access to the elements in the upper compartment 15. Doors 18 are provided in the upper compartment 15.

In operation, the accelerated electrons passing through the exit window 2 strike the material to be irradiated and a deceleration of said electrons in the material 11 results in strong X-ray radiation. Moreover, interaction of these accelerated electrons and the air within the zone of the irradiated material 11 forms chemically active substances These substances concentrate in the lower compartment 14 of the chamber 10 and do not penetrate through the air-tight partition 12 into the upper compartment 15.

As for the X-ray radiation, it also does not penetrate through the partition 12, but penetrates into the upper compartment 15 through the vacuum volume of the chamber 1. Since the partition 12 is located close to the throat of the chamber 1, where the cross-sectional area of the latter is comparatively small, intensity of the X-ray radiation in the upper compartment 15 will be substantially decreased.

Thus, the partition 12, confining the zone of chemical corrosive gaseous medium and of strong radiation inside the radiation protection chamber 10 prevents the vacuum pumps 3, the scanning system 8 and the device 5 against chemical attack and considerably reduces X-ray radiation effect on these elements.

COMMERCIAL APPLICABILITY

This invention can be widely used in radiation plants of commercial process, applied, for example, for chemical-radiation treatment of materials, and in those of laboratory type, designed for scientific investigations in the field of chemical-radiation technology. The proposed construction of the chamber for radiation protection simplifies maintenance of the accelerator and increases its reliability.

We claim:

1. An electron beam accelerator comprising:
a radiation protection chamber;
a vacuum chamber having an exit window and positioned within said protection chamber;
an electron beam scanning system positioned adjacent the vacuum chamber opposite to the exit window of said vacuum chamber;
vacuum pumps connected to the vacuum chamber;
a vacuum monitoring device connected to the vacuum chamber;
said protection chamber including a partition which divides the protection chamber into two compartments, one compartment accommodating the exit window of the vacuum chamber, and the other compartment accommodating the electron beam scanning system, the vacuum pumps and the vacuum monitoring device, said partition blocking X-ray radiation between said compartments and including sealing means to engage said vacuum chamber and provide a substantially air-tight seal between said compartments.

* * * * *